Aug. 3, 1965    W. D. LEWIS ETAL    3,198,335
PERMEATION APPARATUS
Filed Aug. 1, 1962    5 Sheets-Sheet 1

INVENTORS
W. DEIN LEWIS
SHERMAN A. ROGERS

Norbert F. Reinert
ATTORNEY

INVENTORS
W. DEIN LEWIS
SHERMAN A. ROGERS
BY Norbert F. Reinert
ATTORNEY

Aug. 3, 1965

W. D. LEWIS ETAL

3,198,335

PERMEATION APPARATUS

Filed Aug. 1, 1962

INVENTORS
W. DEIN LEWIS
SHERMAN A. ROGERS

Norbert F. Reinert

ATTORNEY

United States Patent Office 3,198,335
Patented Aug. 3, 1965

3,198,335
PERMEATION APPARATUS
William Dein Lewis, Wilmington, Del., and Sherman A. Rogers, Landenberg, Pa., assignors to E. I. du Pont de Nemours and Company, Wilmington, Del., a corporation of Delaware
Filed Aug. 1, 1962, Ser. No. 213,917
15 Claims. (Cl. 210—321)

The present invention relates to permeation apparatus for the separation of one or more fluids from a fluid mixture. More particularly, this invention relates to a large surface area permeation apparatus that utilizes hollow, thin-walled filaments of a material suitable as a permeation barrier.

It is well known that materials such as glass and various types of organic polymers, when formed into thin, non-porous barriers display the remarkable property of being semi-permeable to mixtures of gases or liquids whereby, under certain conditions, such barriers exhibit high selectivity to one constituent gas or liquid of the mixture. The same phenomenon is often referred to in the art as activated diffusion and, hence, hereinafter the terms "permeation" and "activated diffusion" as used are synonymous. As illustrations of such permeation or activated diffusion separations, helium may be recovered in a relatively pure state from gaseous mixtures containing the same, through a barrier of silica-type glass or a barrier of polystyrene. Similiarly, oxygen may be recovered from a mixture of gases containing the same, through a barrier of ethyl cellulose.

The various factors that a high transfer rate of permeation is dependent on in these separations and similar type separations are well appreciated, such as very small thickness of barrier, a high pressure differential between the high and low pressure side of the barrier and a high operating temperature. Yet to make separation processes by permeation attractive for commercial operations, it is also necessary to maximize to the greatest extent possible the surface area of permeability per unit of volumetric space occupied by the permeation apparatus in which the method is to be practiced.

It is, therefore, the object of the present invention to provide permeation apparatus utilizing as permeation barriers, the walls of very fine, hollow filaments, of the size commonly used in textile manufacture, arranged in densely packed layers, whereby the surface area of permeability per unit of volumetric space of the apparatus is maximized.

It is a further object of this invention to provide a simple inexpensive means for separating fluids at relatively high separation rates at mildly elevated temperatures.

It is a further object of this invention to provide thin section permeation barriers in micro size tubular form that can withstand high pressure gradients without rupture.

It is a further object of this invention to provide permeation apparatus offering higher transfer rates of permeation due to improved fluid flow uniformity.

The above and other objects and advantages which will be apparent from a reading of the following description and appended claims are realized in accordance with the present invention by providing a permeation apparatus comprising a closed vessel, a plurality of hollow, thin-walled filaments of a material suitable as a permeation barrier densely packed and confined in closely spaced, separate layers within said vessel, said hollow filaments being secured in a fluid tight collecting chamber within said vessel with all open ends of each of said hollow filaments communicating with said chamber, means for communicating with the interior of said vessel and means for communicating with the interior of said collecting chamber.

Preferably, the individual layers of densely packed, hollow filaments are individual permeation cells comprising a fluid tight header means, framework means rigidly connected to said header means defining a porous, enclosed space proximate said header means, a plurality of hollow, thin-walled filaments confined in said enclosed space in a densely packed layer, each of said hollow filaments having at least one open end with the open end extremities of said hollow filaments being secured in said header means, whereby all open ends of each of said hollow filaments communicate with said header means; and the permeation apparatus of the invention involves a series of said permeation cells of like construction stacked in combination within a closed vessel with means for introducing a fluid mixture to said closed vessel, means for removing permeate fluid from said header means of said permeation cells, and means for removing the permeate depleted fluid mixture from said vessel.

The hollow, thin-walled filaments employed in the permeation apparatus of the present invention may be made from any material suitable as a permeation barrier which can be produced in a non-porous tubular form of very fine size possessing a degree of flexibility so that the filaments can be made to adapt to the configuration of the apparatus as shown hereinafter without fracturing. Preferred hollow filaments for high transfer rates of permeation have a size ranging from about 10 to 250 microns external diameter with the external diameters being from about 1 to 3 times the internal diameter. It is, of course, to be understood that the particular material will be chosen based on its particular selectivity in the separation desired.

Two highly preferred permeation barriers contemplated for the present invention are silica type glass and organic polymers. A means for producing hollow glass filaments of the desired size stated above is described in an article entitled "Extraction of Helium From Natural Gas. The Diffusion-Through-Glass Process" by N. Melnyk and H. W. Habgood, published in The Canadian Mining and Metallurgical Bulletin, October, 1961, pp. 768–774 inclusive. A means suitable for preparing hollow polymeric filaments of the desired size stated above is fully described in U.S. Patent 2,999,296. Illustrative examples of polymeric materials suitable as permeation barriers in the invention are polystyrene, polyethylene, polyethylene terephthalate, polyvinyl chloride, polyvinylidene chloride, polyhexamethylene adipamide, polyacrylonitrile, ethyl cellulose, celluose propionate, copolymers of tetrafluoroethylene and hexafluoropropylene, copolymers of acrylonitrile and vinyl chloride, and copolymers of butadiene and styrene.

It is to be appreciated that the walls of the hollow filaments are non-porous being substantially free of discrete holes or pores. These hollow filaments do not function by a molecular sieving acting nor by Graham-type diffusion through holes. Rather, permeation results by movement of the desired material through the permeation barrier by an activated diffusion process.

A better understanding of the features and advantages of the invention will be gained from the following detailed description of specific illustrative arrangements of the invention taken in conjunction with the accompanying drawings in which.

Figure 1:
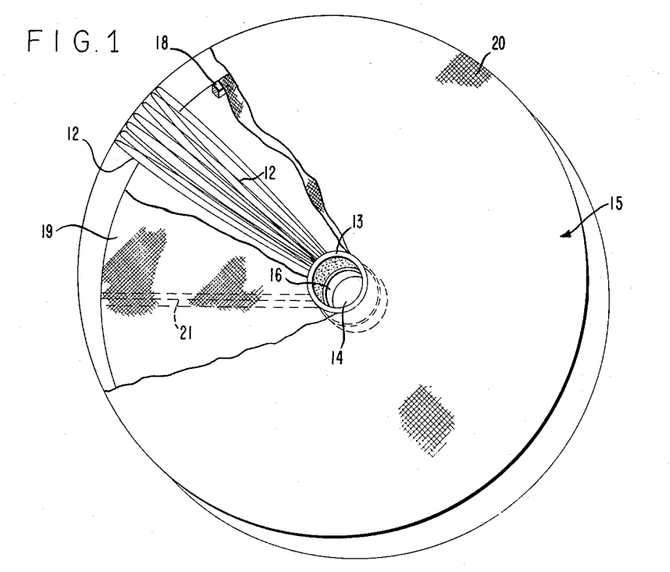
FIGURE 1 shows an isometric view of a partially opened permeation cell.

In more detail in FIGURE 1, a representative permeation cell 10 of the present invention is schematically shown including a plurality of hollow, thin-walled filaments 12 that extend generally radially as a series of loops with the ends terminating in a centrally disposed cavity 14, and a supporting metal framework 15 defining a porous, substantially planar space in which hollow filaments 12 are enclosed. The framework 15 comprises an endless metal rim 17 which is connected rigidly in spaced relationship by equally spaced spokes 21 to an annular metal ring 16. A bottom screen 19 of open mesh wire that supports the hollow filaments 12 rests on the spokes 21 and on a narrow shoulder formed by an expandable elastomeric strip 18 attached to the inner surface of rim 17 by means not shown. A matching top screen 20 encloses the filaments 12 within the framework 15.

Figure 2:
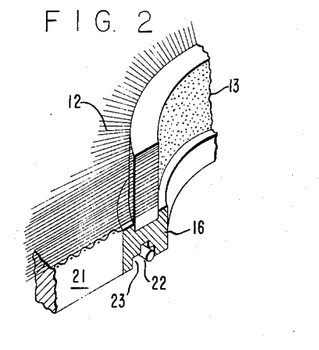
FIGURE 2 shows an isometric view of a partial transverse cross sectional view at plane 2—2 of the arrangement of FIGURE 1.

As shown in FIGURE 2, the extremities of the hollow filaments 12 are encapsulated in an annular header 13 which is formed in a manner described hereinafter and which consists of a tough fluid tight sealing compound such as an epoxy resin from which the end openings of the hollow filaments 12 communicate with cavity 14. The upper surface of the ring 16 is grooved to accommodate the header 13 and assure a fluid tight bond between header 13 and ring 16. As the underside of ring 16 a groove 23 provides a seat for a gasket 22 for purposes of sealing the individual cavities 14 to form a continuous fluid-tight collecting tube 67 (FIGURE 8) when a series of permeation cells 10 are combined to form a multi-stage permeation apparatus.

Figure 3:
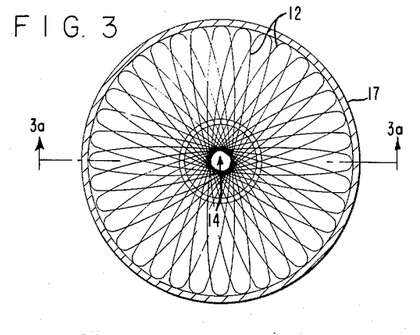
FIGURE 3 shows a plan view of a conventionally filled permeation cell.
Figure 3A:
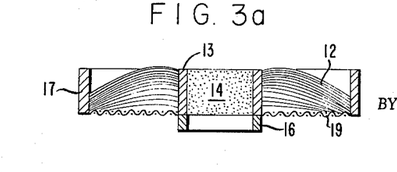
FIGURE 3a shows a cross sectional elevation view of the cell of FIGURE 3 taken along line 3a—3a of FIGURE 3.

FIGURES 3 and 3a illustrate a permeation cell 10 comprising elliptical loops of hollow filaments 12 laid down generally diametrically and crossing the cavity 14 at regular intervals. This arrangement illustrates an ordinary laydown pattern, by means described hereinafter, in which the density of the filaments will decrease toward the periphery of cell 10 as indicated. Such laydown patterns are not preferred for fabrication of permeation cells of the invention since they create non-uniform filament density within the cell which interferes with the attainment of the highly uniform fluid flow. Moreover, such a laydown pattern does not allow as dense a filling of hollow filaments 12 within the cell as is possible by other laydown patterns.

Figure 4:
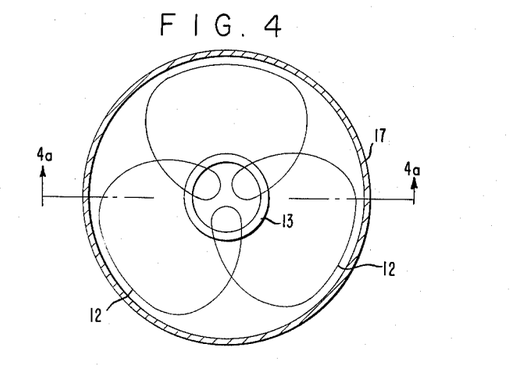
FIGURE 4 shows a plan view of a programmed laydown of filament loops in a permeation cell.
Figure 4A:
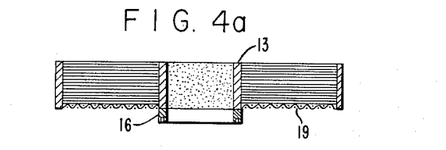
FIGURE 4a shows a cross sectional elevation view of the cell of FIGURE 4 taken along line 4a—4a of FIGURE 4.
Figure 5:
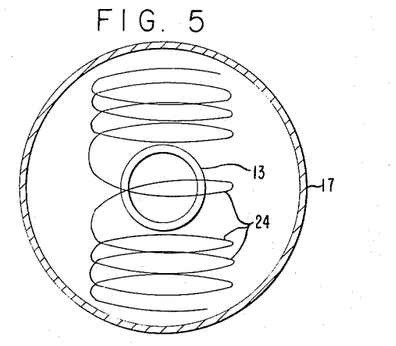
FIGURE 5 shows a plan view of a filament arrangement in a permeation cell comprising many small convolutions.
Figure 5A:
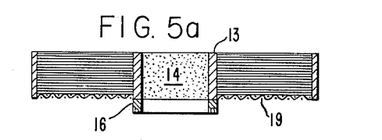
FIGURE 5a shows a cross sectional view of the cell of FIGURE 5 taken along line 5a—5a of FIGURE 5.

FIGURES 4, 4a, 5, and 5a illustrate more preferred laydown patterns that substantially eliminate irregular filling and non-uniform distribution of fibers in cell 10 promoting uniformity in fluid flow through the cell and maximum surface area of permeability. Referring more particularly to FIGURES 4 and 4a, it will be seen that filaments 12 trace broad sweeping loops that cross cavity 14 at various angles thereby causing the crossover points to occur uniformly distributed throughout the laydown region and in effect eliminating uneven buildup. In FIGURES 5 and 5a the loops of filaments 12 are formed in a similar manner as described in FIGURE 4, but each loop is provided with series of convolutions designated at 24. The pitch distance between convolutions 24 is varied during laydown such that in the region bordering the cavity 14, where the laydown area is relatively small, a limited number of widely spaced convolutions 24 is deposited and as a filament 12 loop progresses toward the periphery of the pack the number of convolutions 24 is gradually increased, in a predetermined programmed manner, to accommodate the increase in the laydown area.

Figure 6:
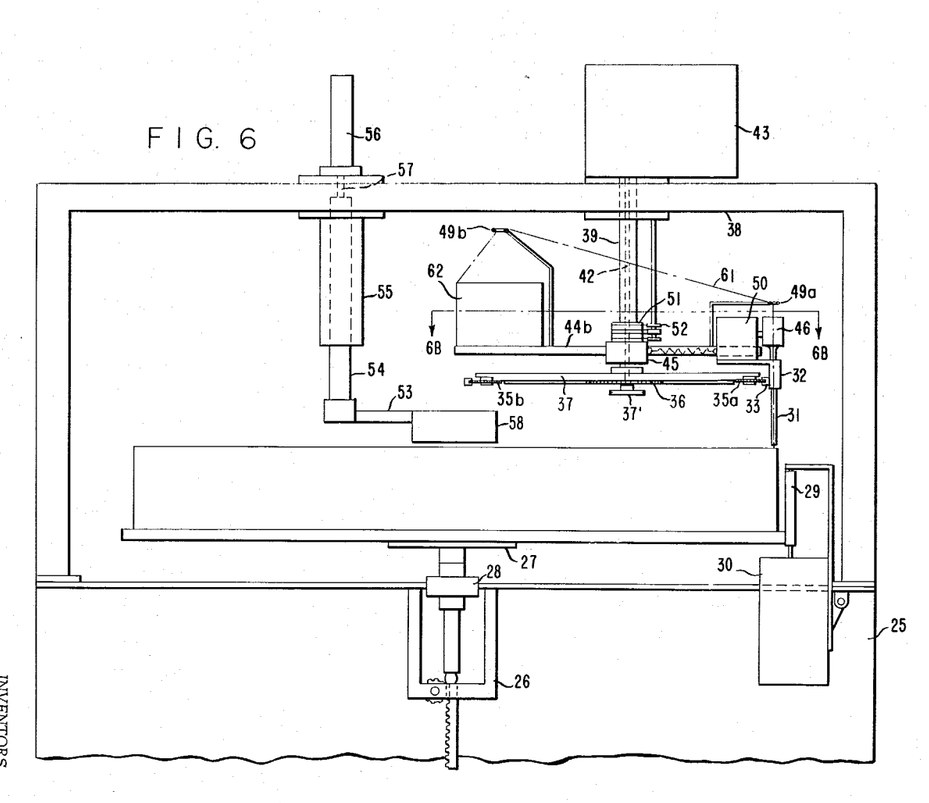
FIGURE 6 shows an elevation view of a filling apparatus for fabricating a permeation cell.
Figure 6A:
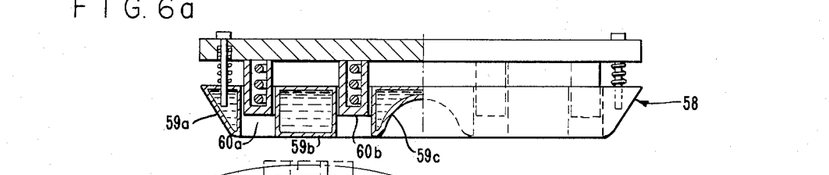
FIGURE 6a shows a plan view of the filling apparatus of FIGURE 6 taken along line 6a—6a of FIGURE 6.
Figure 6B:
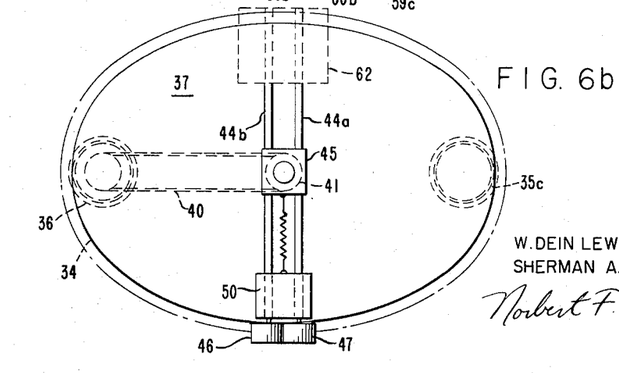
FIGURE 6b shows a further plan view of the filling apparatus of FIGURE 6 taken along line 6b—6b of FIGURE 6.

Referring now to FIGURES 6, 6a, and 6b, a filling apparatus for fabricating an individual permeation cell of the invention is shown schematically. The filling apparatus comprises a base 25 affixed with an elevating mechanism 26 on which rests a rotatable table 27 in turn restrained horizontally by a frictionless bearing support 28. The table 27 is rotated by a tractively engaged pulley 29 keyed to the shaft of variable speed electric motor 30. Above the table 27 a generally vertical piddling tube 31 is connected through a support fixture 32 to a roller chain 33. Roller chain 33 runs against curved track 34 and is engaged with sprockets 35a, 35b, 35c, and 36 which are attached through frictionless bearing supports (not shown) to a fixed support plate 37. Support plate 37 is rigidly connected to stationary support frame 38 through a hollow tube 39. Sprocket 36 is mounted on a common shaft (not shown) with pulley 37'. Belt 40 is tractively engaged with pulley 41 which is rigidly attached to shaft 42, an extension of the output shaft of variable speed electric motor 43. Shaft 42 is supported in frictionless bearings (not shown) within hollow tube 39 and is concentric with same.

Returning to the piddling tube support arrangement, support fixture 32 is rigidly attached to bars 44a and 44b, which are slidably journaled in linear frictionless bearings (not shown) retained in rotatable block 45. Block 45 in turn is mounted on hollow tube 39 with frictionless bearings (not shown). Roll 46 is keyed to the shaft of a variable speed direct current electric motor 50, which in turn is mounted rigidly on support fixture 32. Roll 47 tractively engaged with roll 46 is likewise supported from support fixture 32 by a fixed shaft and frictionless bearing (neither shown). Guide rings 49a and 49b are attached to bars 44 and 44b and provide a means for guiding a tow of hollow filaments 12 to rolls 46 and 47 during filling operations.

Electrical power is fed to motor 50 through wiring (not shown) attached to slip rings 51 and brushes 52.

Cantilevered arm 53 swings about a pivoted and slidable post 54 supported in sleeve bearings (not shown) in mount 55 rigidly attached to frame 38. Air cylinder 56 likewise rigidly attached to frame 38 is further attached to post 54 through a contained piston rod 57 which imparts vertical motion to post 54 when actuated. Rigidly attached to arm 53 is a platen 58 consisting of concentric metal rings 59a, 59b, and 59c, 60a, and 60b. Rings 59a, 59b, and 59c are water cooled, whereas rings 60a and 60b are electrically heated for reasons to be discussed later.

A typical cell 10 fabrication is carried out as follows. A framework 15 is clamped to the table 27 (by means not shown) and the speed of the table 27 is adjusted in accordance with the desired laydown pattern. The table 27 elevation is positioned by the elevating mechanism 26 to bring the frame 15 near the end of the piddling tube 31. The elevation of the table 27 will be reduced during cell 10 fabrication as the depth of filaments 12 increases.

The speeds of the motors 50 and 43 are likewise selected in accordance with the desired laydown pattern such that the linear velocity of the tow 61 coincides with the surface velocity of the cell 10 below the piddling tube. The laydown pattern will approximate the shape of the track 34 and can be altered by replacing same with alternate tracks of various shapes which in turn will produce filament loops of various lengths. The rotatable table 27 is advanced at a predetermined rate by selecting the speed of motor 30. A tow package 62 is placed on the bars 44a and 44b and the filament tow 61 is strung through guides 49a and 49b, through the nip formed by rolls 46 and 47, and through the piddling tube 31. At this point, the permeation cell 10 filling operation commences and the piddling tube 31 advances around the track 34 being moved by chain 33. As the tow 61 of hollow filaments 12 is piddled, the frame 15 and table 27 is slowly advanced by motor 30 to produce side by side loops of tow 61 over the entire surface of the frame 15. At selected intervals during the filling operation, the piddling is stopped and the platen 58 is rotated over the center of the cell 10. Two concentric rings of wax are placed in position under the platen 58 after which the platen 58 is lowered to melt the wax around the filaments in discrete areas thus forming wax barriers when allowed to cool upon removal of the platen 58. Repeated applications of filaments 12 and wax result in two homogeneous wax barriers being produced in the center of the cell thus forming an annular space for subsequent resin encapsulation to form header 13.

When a predetermined amount of filaments 12 is deposited, the cell 10 is removed from the table 27 for subsequent operations involving resin encapsulation to form header 13, resin curing, cutting out the filaments 12 crossing the cavity 14 and machining the upper part of header 13 to exact dimension for the purpose of facilitating its installation in a multi-stage permeation apparatus. The top screen 20 is fitted in place and the permeation cell 10 is ready for installation.

The permeation cell may be fabricated in a variety of shapes and sizes. In practice, an annular shape is preferred since normally the cells will be utilized in pressure vessels of cylindrical shape. The external diameter of cell 10 may range from less than a foot to several feet depending on the size of the pressure vessel in which it is to be utilized. The diameter of the cavity 14 may also vary considerably depending on the external diameter of cell 10. The height of the cell is not critical, but it is preferred to maintain the height less than one foot to aid uniform flow of fluids and insure high transfer rates of permeation.

As previously stated, the hollow filaments 12 are densely packed within the framework 15 of cell 10. The packing density of hollow filaments 12 in an enclosed space provided by the framework 15 of a cell 10 can be defined by the equation $$X = \frac{100lA}{V}$$

wherein X is the packing density of hollow filaments in percent; A is the average cross sectional area of the hollow filaments 12; $l$ is the total length of hollow filaments 12 in the container; and V is the internal volume of the porous enclosed space provided by framework 15 of a cell 10. A packing density of 40% may be readily achieved according to the laydown patterns illustrated in FIGURES 4 and 5. To insure a large surface area per unit of volumetric space of permeation apparatus, it is contemplated that a packing density of hollow filaments 12 of at least 10% be attained for the individual cells 10; a packing density of 25% to 50% being preferred.

The lengths of filaments 12 will vary considerably depending upon the outer dimensions of cell 10 and the particular laydown pattern utilized in fabricating the densely packed layer of hollow filaments. Furthermore, it has been found that for any given separation of fluids, a particular inter aperture length of hollow filament, that is, the length of filament between the end openings sealed in header 13, will optimize transfer rate of permeation if all other conditions remain constant. For the same reason, it is, of course, preferred that there be uniformity of length for the hollow filaments present in the layer.

Figure 7:
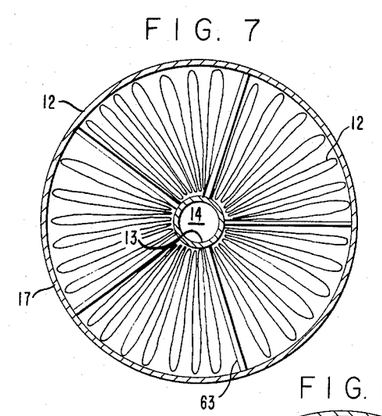
FIGURE 7 shows a plan view of an alternate arrangement of hollow filaments in a permeation cell.

FIGURE 7 shows a cell 10 in which hollow filaments 12 are laid down and secured in header 13 in "hanks" rather than individually. Partitions 63 are equally spaced within the annular zone between header 13 and outer rim 17 providing a defined area for a laydown of each individual hank which can readily be done by hand if desired. These partitions make it easier to achieve uniform distribution in building successive layers of hanks of filaments so that a cell 10 of densely packed filaments is achieved.

It will be understood that the hollow filaments 12 for effective use in cell 10 need only be secured at one extremity to header 13 so long as this secured extremity has an open end communicating with the interior of header 13 and the unsecured extremity has a closed end.

Figure 8:
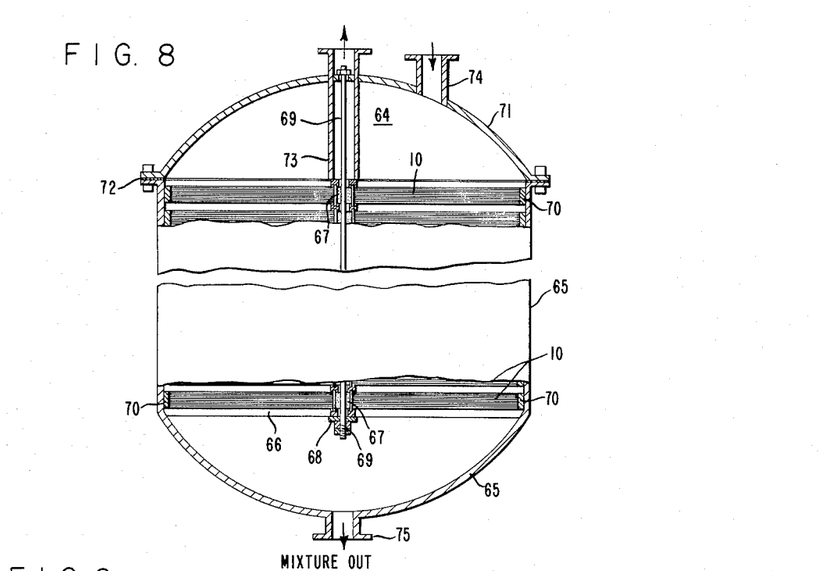
FIGURE 8 shows an elevation view in cross section of permeation apparatus utilizing a series of permeation cells of the invention.

Referring now to FIGURE 8, a plurality of permeation cells 10 are assembled together as a stack in a cylindrical-shaped shell 65 and form a multi-stage separator 64. The stack of cells is supported on a spider framework 66 which is attached rigidly to the inner surface at one end of the shell 65. The ring 16 interfaces of the cells 10 (see FIG. 2 for detail) are provided with gaskets 22 and integrate the individual cavities 14 into a fluid-tight continuous collection tube 67 while a gasket 68 seals the bore opening of the tube 67 which contacts the spider frame 66. A fluted tie bolt 69 extends the length of the tube 67 and holds the stack together and to the spider frame 66. The clearance space between the stack and the inner surface of the shell 65 is packed with resilient packing glands 70. A detachable cap 71 which provides a means for installing the cells 10 is attached rigidly to the shell 65 by means of a plurality of threaded fasteners arrayed around a pair of flanges. A gasket 72 provides a fluid-tight seal at the flange interface. The collection tube 67 communicates exteriorly of the shell 65 by means of an outlet conduit 73 which is fastened at one end of the cap 71 and abuts at the other end in a fluid-tight manner to the bore opening of the tube 67. Inlet 74 in the cap 71 provides a means for admitting a gas mixture into the shell 65 while outlet 75 exhausts the depleted mixture.

In operation of the above-described permeation apparatus of the invention, a fluid mixture is admitted into inlet 74 at superatmospheric pressure and circulated through the multi-stages of the cells 10. The resilient glands 70 prevent the fluid mixture from shunting the stack of cells. As the mixture circulates through the various stages in contact with the external surfaces of hollow filaments 12, a certain fluid constituent preferentially permeates through the thin-wall sections and into the internal pasageways of filaments 12. The constituent fluid collects at tube 67 whereupon it is forced out through conduit 73 by the differential pressure between the inner and outer sides of the separator 65 and collected for further enrichment in subsequent separators or stored for later end use. Meanwhile, the permeate depleted fluid mixture continues through separator 64 and eventually exhausts from the outlet 75.

The foregoing apparatus employing hollow filaments of poylethylene terephthalate may be operated utilizing natural gas containing helium as the feed fluid mixture in order to collect a permeate gas from conduit 73 with helium content highly enriched over that present in the natural gas feed. The principles of operation of the apparatus also apply to the separation of a normally liquid material from a mixture of liquids containing the same. Usually in such separations, the operating pressure is atmospheric or elevated to whatever pressure may be required to keep the charge in the liquid phase. The permeating material is removed rapidly, usually in vapor phase, under reduced pressure to maintain a high concentration gradient across the membrane.

The foregoing described permeation apparatus offers many advantages, particularly over the shell and tube design apparatus which has been proposed for utilizing tubular shaped membranes in separations by permeation. The permeation apparatus of the invention substantially eliminates stagnant areas and attains improved fluid flow uniformity due to equalizing voids in the spacing provided between individual permeation cells. In practice, the best uniformity of fluid flow and highest transfer rates are obtained by introducing the fluid mixture into the apparatus in a direction perpendicular to the aligned stack of cells. The apparatus also offers wide versatility in size and capacity inasmuch as the diameter or size of the permeation cells may be varied and the number of cells and spacing thereof may be varied to fit the requirements of the desired separation. The individual permeation cells improve hollow filament handling during and after separator manufacture since the filaments are confined within an enclosed space. Moreover, the individual cells provide a convenient unit for leak testing of the hollow filaments before installation in the apparatus and make it a relatively simple matter to replace an area of hollow filaments which may have been damaged or which are leaking within the apparatus for any reason without interfering with the hollow filaments which are in proper functional order in the other cells of the apparatus.

Figure 9:
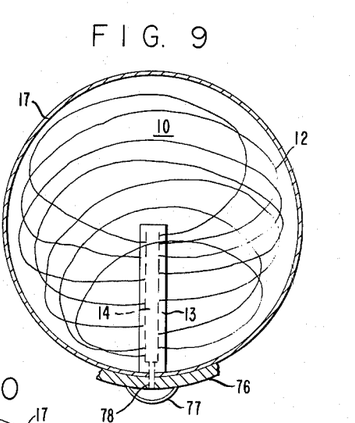
FIGURE 9 shows the essential features in plan view of an alternate arrangement employing the principles of the present invention.

An alternate design of permeation cell 10 and mode for assembling cells of such alternate construction together to form a multi-stage separator is indicated in FIGURE 9. In this instance, header 13 having a cavity 14 is shown traversing the radius distance of the permeation cell 10. Header 13 may be in the form of a simple conduit or a rectangular chamber having a height equivalent that of the permeation cell. A framework means, of which only outer rim 17 is shown, is rigidly connected to header 13 defining an enclosed area proximate header 13. A plurality of open end hollow filaments 12 are densely packed within said enclosed area, the open end extremities of each of said hollow filaments 12 terminating in header 13 whereby the interior of the hollow filaments 12 communicate with cavity 14. A plurality of cells of this construction are assembled together as a stack in a pressure vessel, the wall of which is partially shown in FIGURE 9 as numeral 76. The pressure vessel has along its outside wall a fluid tight collecting manifold 77 which communicates with cavity 14 of each of the permeation cells 10 by means of a plug connector 78 passing through wall 76 of the vessel at each level of the vessel where a cell 10 is situated.

It is to be understood that the arrangements of FIGURES 8 and 9 may be operated if desired so that the fluid feed mixture is introduced into the interiors of hollow filaments 12 and then diffusion through filaments 12 will take place in the opposite direction and the permeate fluid will be collected from outlet 75 of separator 67. The process carried out in this manner for these arrangements would, obviously, be intermittent in character; it being necessary to inject a charge of the fluid mixture into the interior of filaments 12 and after a period sufficient for substantially all of the permeate fluid to diffuse through the filaments the charge must be withdrawn and a new charge of the mixture introduced.

Figure 10:
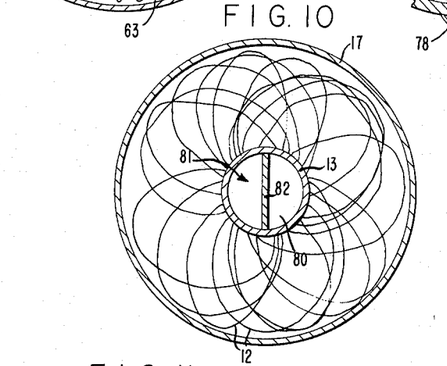
FIGURE 10 shows the essential features in plan view of an alternate arrangement of a permeation cell of the invention permitting continuous flow of a fluid feed mixture through the interior of the hollow filaments.

In FIGURE 10, an alternative arrangement of a permeation cell 10 is shown which permits continuous flow of a fluid mixture into the interiors of the hollow filaments 12 for large scale separation of one constituent fluid from a fluid mixture. In FIGURE 10, header 13, the cavity 14 is divided into two sections, header section 80 and 81, by means of diametral plate 82. Hollow filaments 12 are laid down within the enclosed space surrounding header 13 the outer extremity of which is defined by rim 17 in a manner whereby each filament communicates at one open end with header section 80 and communicates at the other open end with header section 81. A plurality of cells of this same construction can then be assembled together in a closed vessel in such a manner as to form a tight seal between the successive diametral plates 82 of the various cells so that header sections 80 of the cells communicate with header sections 81 of the cells only by means of hollow filaments 12 within the closed vessel. In operation of such a separator, the fluid feed mixture is introduced into header section 80 and withdrawn from header section 81 and permeate fluids are withdrawn from the closed vessel from the space surrounding the outside of the hollow filaments.

Figure 11:
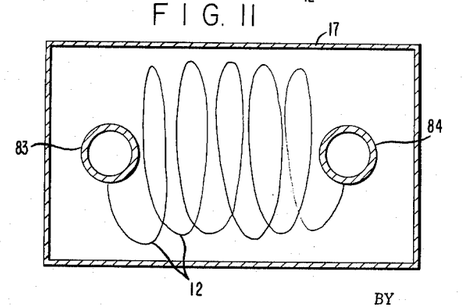
FIGURE 11 shows a plan view of an alternate arrangement of a permeation cell of the invention also permitting continuous flow of a fluid feed mixture through the interior of the hollow filaments.

FIGURE 11 illustrates a further arrangement of a cell 10 for providing for continuous flow of a fluid mixture through the interiors of hollow filaments 12. In FIGURE 11, two headers 83 and 84 are spaced apart in cell 10. A framework means, of which only outer rim 17 in the form of a rectangle is shown, is rigidly connected to headers 83 and 84 defining an enclosed area surrounding the headers. A plurality of open end hollow filaments 12 are laid down in a manner whereby each filament communicates at one open end with header section 83 and communicates at the other open end with header section 84. A plurality of cells of this same construction may be assembled in a coaxially aligned stack in such manner as to form a tight seal between headers 83 and 84 and outer rim 17 of the individual cells. Such an assembly of cells may be covered at top and bottom so as to provide a fluid-tight enclosure surrounding hollow filaments 12 within the individual cells. Such arrangement eliminates the need of a separate closed vessel for housing the stacked vessels and in operation the fluid feed mixture is introduced into header 83 and withdrawn from header 84 while the permeate fluid is withdrawn from the fluid-tight enclosure from an opening provided in either or both the top and bottom covers closing the ends of the stack.

Owing to their micro size, the hollow filaments are capable of withstanding highly elevated pressures even when the method of operation involves flow of the fluid mixture through the interior of the filaments so that high diffusion rates may be maintained. Utilization of the apparatus of the invention in this manner, furthermore, has the advantage of eliminating the need for a pressure vessel surrounding the cells and, as indicated in connection with the description of FIGURE 11, makes it possible to stack the cells together in such a fluid-tight manner as to eliminate any requirement for a separate closed vessel.

Since obviously many different embodiments of the invention may be made without departing from the spirit and scope thereof, it is to be understood that the invention is not limited by the specific illustrations except to the extent defined in the following claims.

We claim:

1. A permeation apparatus including a closed vessel; a plurality of aligned stacked detachable permeation cells of like construction, each of said cells comprising a fluid tight header means having an interior portion, open framework means connected to said header means defining an enclosed zone adjacent said header means, a plurality of flexible hollow, thin-walled filaments of a material suitable as a permeation barrier confined in said zone in a densely packed layer, said filaments in said layer being freely movable within the limits of said framework, each of said filaments having at least one open end portion with the open end portions of said hollow filaments being secured to said header means so that all open ends of each of said filaments are in free communication with the interior portion of said header means; means for securing said stack of said permeation cells to each other and in position in said vessel; inlet means for admitting a fluid mixture into said vessel; outlet means communicating with the interior portion of said header means of said permeation cells for removing fluids permeating through the walls of said hollow filaments from the interior of said hollow filaments and outlet means for removing the permeate depleted fluid mixture from the vessel.

2. A multi-stage permeation apparatus including a closed vessel, a plurality of aligned stacked permeation cells of like construction, each of said cells comprising a header means, said header means having an interior portion which is divided into two longitudinal fluid-tight compartments, open framework means rigidly connected to said header means defining an enclosed space adjacent said header means, a plurality of flexible hollow, open-end, thin-walled filaments of a material suitable as a permeation barrier confined in said closed space in a densely packed layer, said filaments being displaceable in said layer within the limits of said framework, each of said hollow filaments having one open end in communication with the interior of the first fluid-tight compartment of said header means and the other open end extremity thereof communicating with the interior of the second fluid-tight compartment of said header means; means for securing said stack of said permeation cells in said vessel; means for releasably securing said stack of said permeation cells in coaxial alignment in said vessel so that said header means of said permeation cells are maintained in engagement with each other to form two elongated fluid-tight chambers within said vessel wherein the first of said chambers communicates with the second of said chambers only by means of said hollow filaments; inlet means for introducing a fluid mixture into said first elongated chamber, outlet means for withdrawing a permeate depleted fluid mixture from said second elongated chamber; and outlet means for withdrawing fluid permeating through the walls of said hollow filaments from said closed vessel.

3. A permeation apparatus including a pressure vessel; a plurality of stacked permeation cells of like construction, each of said cells comprising a conduit, said conduit having an interior portion, open framework means rigidly connected to said conduit defining an enclosed space proximate said conduit, a plurality of hollow, thin-walled, organic polymeric filaments confined by said framework means in said enclosed space in a densely packed layer, said filaments being freely movable in said layer within the limits of said framework each of said filaments having at least one open end portion with the open end portions of said hollow filaments being secured to said conduit so that all open end portions of each of said filaments communicate with the interior portion of said conduit; means for securing said stack of said permeation cells in coaxial alignment in said vessel so that said conduits of said permeation cells are brought into engagement with each other to form an elongated, fluid-tight collecting tube within said vessel; inlet means for admitting a fluid mixture into said vessel for flow in a direction perpendicular to said coaxial aligned stack permeation cells; outlet means for communicating with said collecting tube for removing fluids permeating through the walls of said hollow filaments from the interior of said filaments; and outlet means for removing the permeate depleted fluid mixture from said vessel.

4. A multi-stage permeation apparatus including a pressure vessel; a plurality of stacked permeation cells of like construction, each of said cells comprising, a conduit, framework means rigidly connected with said conduit defining an annular zone surrounding said conduit and extending outwardly from said conduit, a plurality of flexible hollow, open-end, thin-walled, organic polymeric filaments confined in said zone in a densely packed layer, said flexible filaments being displaceable within the limits of said framework, said filaments being secured to the walls of said conduit so that the open ends of said filaments communicate with the interior of said conduit; releasable means for securing said stack of said permeation cells in coaxial alignment in said vessel so that said conduits of said permeation cells are brought into alignment and fluid-tight engagement with each other to form an elongated fluid-tight collecting tube within said vessel; inlet means for admitting a fluid mixture into said vessel for flow in a direction perpendicular to said coaxial aligned stacked permeation cells; outlet means for communicating with said collecting tube for removing fluid permeating through the walls of said hollow filaments from the interior of said filaments; and outlet means for removing the permeate depleted fluid mixture from said vessel.

5. A permeation cell component suitable for use in apparatus for separation of fluids, said component comprising a header means having an interior portion, a longitudinal partitioning means within the interior portion of said header means dividing the interior of said header means into two fluid-tight compartments, framework means connected to said header means defining a space proximate said header means, a plurality of flexible hollow open-end, thin-walled filaments of a material suitable as a permeation barrier, said plurality of filaments engaged and confined by said framework means in said closed space in a layer, said filaments being moveable relative to each other and other components of said structure within the limits of said framework, each of said filaments having one open end portion communicating with the interior of the first fluid-tight compartment of said header means and the other open end extremity thereof communicating with the second fluid-tight compartment of said header means.

6. A permeation cell unit suitable for use in the separation of fluids including a conduit having an interior portion, framework means connected to said conduit defining an annular zone surrounding said conduit and adjacent thereto, a plurality of flexible hollow, thin-walled filaments of a material suitable as a permeation barrier, said plurality of filaments engaged and confined by said framework means in said zone in a layer, said filaments being movable in said layer within the limits of said zone, each of said filaments having at least one open end portion with the open end portions of said filaments being secured to said conduit so that all open end portions of each of said filaments communicate freely with the interior portion of said conduit.

7. A permeation cell unit suitable for use in the separation of fluids including a conduit having an interior portion, an open framework means rigidly connected to said conduit defining an annular zone around said conduit, a plurality of flexible hollow, open-end, thin-walled, organic polymeric filaments confined in said space, said filaments being easily displaceable within the limits of said zone, said filaments secured at their open end extremities in the walls of said conduit, whereby the open ends of said filaments communicate with the interior portion of said conduit, and said filaments extending radially outward from said conduit in loops to substantially fill said zone.

8. The permeation cell unit of claim 6 in which the framework means comprises an endless outer rim member surrounding and spaced from said conduit, supporting members secured to said outer rim member and radially disposed to connect said outer rim member rigidly to said conduit, a first screen member carried by said supporting members and extending between said rim member and said conduit to form a supporting wall defining one limit f said zone, and a secured screen member, corresponding to said first screen member and substantially parallel hereto, but spaced therefrom along said conduit to form another supporting wall defining another limit of said zone.

9. Apparatus for separating fluids by differential permeation said apparatus comprising in combination a closed fluid-tight housing member defining a fluid separation zone, a plurality of cooperating individual fluid separation units maintained in said zone, each unit comprising a solid fluid-impermeable element having a passageway formed therein, said unit further comprising a plurality of highly flexible, non-porous, hollow, thin-walled, small diameter filaments formed of a material suitable as a permeable membrane, each of said highly flexible filaments having a hollow interior portion, a first end portion, a second end portion, and a remaining portion, at least one of said end portions of each filament being open, said open end portions of said flexible filaments secured in a fluid tight manner to said solid element with the hollow interior portions of the open end portions of said filaments in free communication with said passageway formed in said solid element and the remaining portions of said filaments maintained in a freely movable condition, said apparatus further comprising connecting means cooperating with each of said solid elements and constructed and arranged to operatively interconnect, in a fluid tight manner, said passageways in said solid elements for free and open communication between said passageways, a conduit means cooperating with said housing member, said connecting means and said solid elements and to provide free communication with said passageways from outside said housing member, said apparatus further comprising means cooperating with said units and said housing member for supporting and maintaining said units in position relative to each other and relative to said housing member, said apparatus further comprising filament positioning means in said fluid separation zone cooperating with said filaments to support and maintain said filaments of each unit in a general predetermined portion of said fluid separation zone while permitting limited displacement and motion of said movable remaining portions of said flexible filaments relative to each other and the other structure of said apparatus, said housing member provided with inlet and outlet means providing for flow of fluid between said fluid separation zone and a space outside of said housing member.

10. The apparatus of claim 9 in which said individual units and said connecting means are releasably engaged and connected for independent removal and replacement in said apparatus.

11. The apparatus of claim 10 in which said solid elements comprise aligned first tubular wall sections cast in place about open end portions of said flexible hollow filaments, and in which apparatus said connecting means comprises aligned fitted portions of said first tubular wall sections interengaged with each other and with said housing member in fluid-tight relationship.

12. The apparatus of claim 11 in which said filament positioning means comprises foraminous wall structure mounted on each of said first tubular wall sections and operatively engaging the plurality of said flexible hollow filaments of each unit, said filaments densely packed in a predetermined pattern disposed about each of said first tubular wall sections.

13. The apparatus of claim 12 in which said aligned first tubular wall sections are cylindrical in form with circular transverse cross sections, and said connecting means further comprises a second tubular wall section on each unit, said second tubular wall section concentrically disposed about said first tubular wall sections and spaced therefrom, at least one radially extending beam element secured between said tubular wall sections of each unit and engaging said foraminous wall structure of each unit to form a rigid assembly containing the flexible hollow filaments of each unit, said second tubular wall sections constructed and arranged to engage said housing member and assist in positioning said units in alignment within said housing member.

14. The apparatus of claim 13 in which said housing member comprises an elongated closed cylindrical container, and said units are aligned in series positioned generally along the cylindrical container axis, the packing density of said flexible hollow filaments in each predetermined portion of said fluid separation zone being in the range of from 10% to 60%.

15. The apparatus of claim 14 in which said flexible hollow filaments and said solid elements are formed of a solid material essentially comprising an organic polymeric composition.

References Cited by the Examiner

UNITED STATES PATENTS

| | | | |
|---|---|---|---|
| 2,565,388 | 8/51 | McCaskell | 210—331 X |
| 2,674,440 | 4/54 | Donovan | 210—22 X |
| 2,687,997 | 8/54 | Marchand | 210—321 |
| 2,715,097 | 8/55 | Guarino | 210—321 |
| 2,741,595 | 4/56 | Juda | 210—321 X |
| 2,864,506 | 12/58 | Hiskey | 210—321 |
| 2,880,501 | 4/59 | Metz | 210—321 X |
| 2,999,296 | 9/61 | Breen et al. | 161—169 |
| 3,069,014 | 12/62 | Lewis | 210—331 X |

OTHER REFERENCES

Melnyk: "Extraction of Helium From Natural Gas," The Canadian Mining and Metallurgical Bulletin, pp. 768–774, The Canadian Institute of Mining and Metallurgy, Montreal, Quebec, Canada, October 1961.

REUBEN FRIEDMAN, *Primary Examiner.*

HERBERT L. MARTIN, *Examiner.*